(12) United States Patent
Cerf

(10) Patent No.: US 9,776,807 B2
(45) Date of Patent: Oct. 3, 2017

(54) CHANGING ORIENTATION OF AN ARTICLE ON A MOVING CONVEYOR

(71) Applicant: Alain Cerf, Redding Beach, FL (US)

(72) Inventor: Alain Cerf, Redding Beach, FL (US)

( * ) Notice: Subject to any disclaimer, the term of this patent is extended or adjusted under 35 U.S.C. 154(b) by 0 days.

(21) Appl. No.: 14/527,719

(22) Filed: Oct. 29, 2014

(65) Prior Publication Data

US 2016/0221764 A1    Aug. 4, 2016

(51) Int. Cl.
| | | |
|---|---|---|
| *B65G 47/24* | (2006.01) | |
| *B65G 47/00* | (2006.01) | |
| *B65G 47/74* | (2006.01) | |
| *B65G 47/244* | (2006.01) | |
| *B65G 47/08* | (2006.01) | |
| *B65G 47/252* | (2006.01) | |

(52) U.S. Cl.
CPC ......... *B65G 47/244* (2013.01); *B65G 47/088* (2013.01); *B65G 47/252* (2013.01)

(58) Field of Classification Search
None
See application file for complete search history.

(56) References Cited

U.S. PATENT DOCUMENTS

| | | | | |
|---|---|---|---|---|
| 3,014,600 | A * | 12/1961 | Tray | B65G 47/244 198/401 |
| 3,462,912 | A * | 8/1969 | Anderson | B65B 35/56 198/374 |
| 6,116,401 | A * | 9/2000 | Carleton | B65G 11/063 193/46 |
| 2001/0054537 | A1* | 12/2001 | Jones | B65G 47/2445 198/418.1 |
| 2005/0232727 | A1* | 10/2005 | Ferrara | H01L 21/67201 414/217 |

\* cited by examiner

*Primary Examiner* — Kavel Singh
(74) *Attorney, Agent, or Firm* — Sam Silverberg

(57) ABSTRACT

The objective of the invention is to arrange the articles on the conveyor so that the bundle can be easily stacked on top of each other. This problem can occur when the articles have caps on one side of the bundle causing a sloped surface that hinders stacking the bundles. The problem can be solved by arranging the articles so that the caps are always on the outside of the bundle.

14 Claims, 2 Drawing Sheets

FIGURE 2
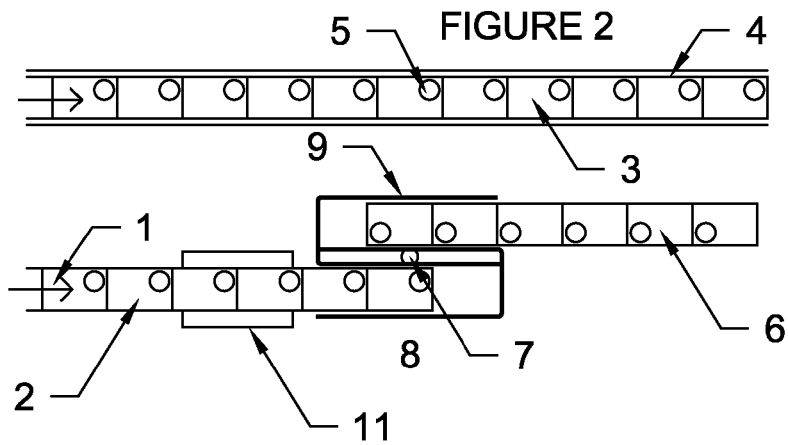
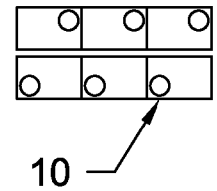
FIGURE 3
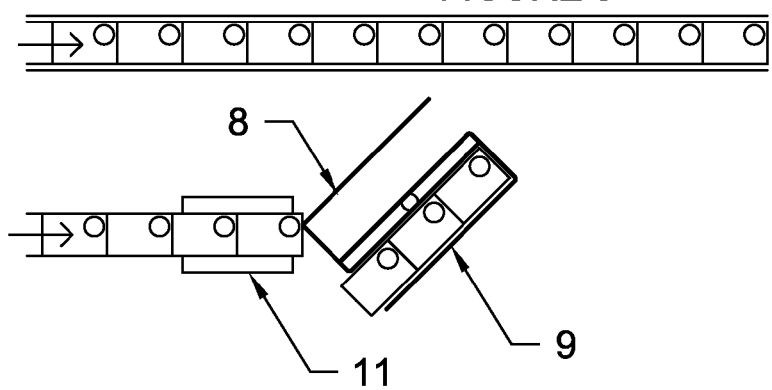
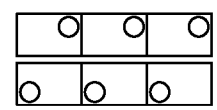
FIGURE 4
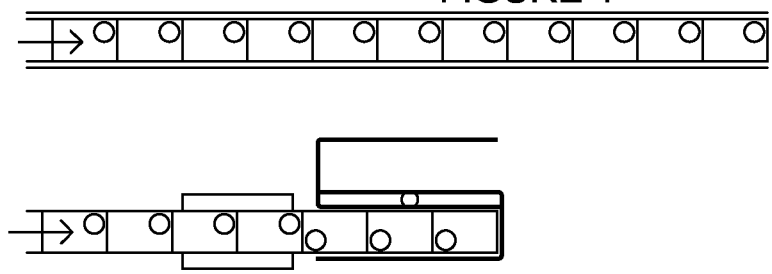
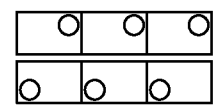
FIGURE 5
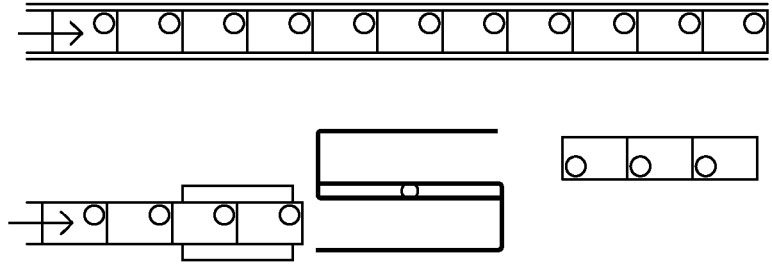
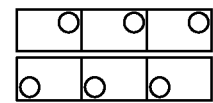

CHANGING ORIENTATION OF AN ARTICLE ON A MOVING CONVEYOR

FIELD OF THE INVENTION

This invention relates to changing the orientation of articles moving on a conveyor prior to wrapping the articles with a heat shrink film. Afterwards the wrapped article(s) are heat shrunk to from a bundle.

SUMMARY OF THE INVENTION

The objective of the invention is to arrange the articles on the conveyor so that the bundle can be easily stacked on top of each other. This problem can occur when the articles have caps on one side of the bundle causing a sloped surface that hinders stacking the bundles. The problem can be solved by arranging the articles so that the caps are always on the outside of the bundle.

BRIEF DESCRIPTION OF THE DRAWING

FIG. 2 shows articles entering and releasing form the housings

FIG. 3 shows rotating the housing 180 degrees

FIGS. 4-5 shows the housing in different positions

DETAILED DESCRIPTION OF THE DRAWING

Figure 1:
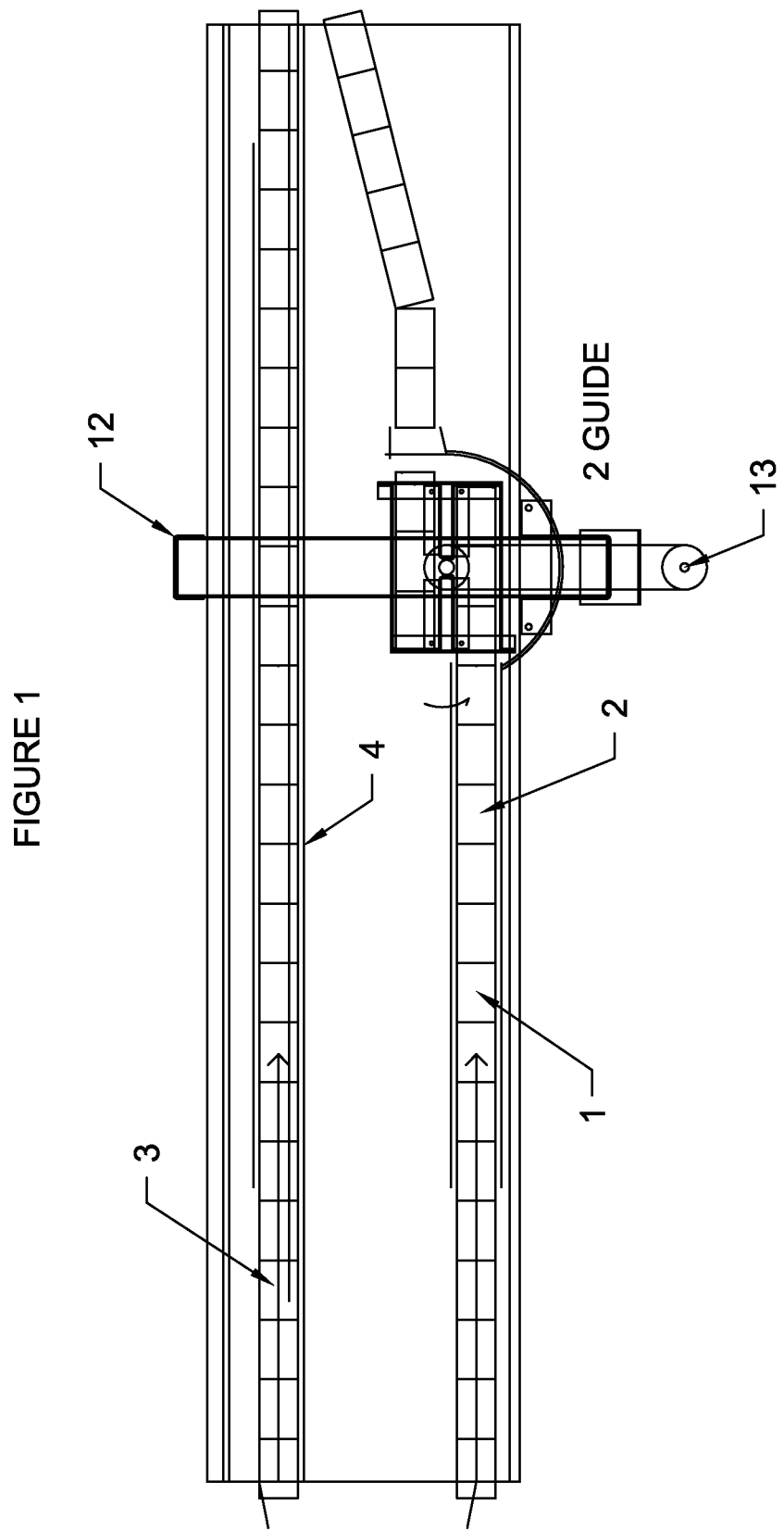
FIG. 1 shoes a two lane where the article in one lane has its orientation changed.

FIG. 1 shows a articles 1 in first lane 2 on a moving conveyor and articles 3 moving on third lane 4 on the conveyor. FIG. 2 shows articles 3 in the third lane having caps 5 on the outside of the lane and articles 1 in first lane 2 having caps 5 on the inside of the lane. In order to arrange articles 1 so that the caps 5 will be on the outside of the bundle as shown in second lane 6, a rotating post 7 having two attached housings 8 and 9 that will allow a predetermined number of articles to enter the housing and rotate the articles in the housing so that the caps will be on the outside of the bundle 10. As the conveyor releases the predetermined articles into new lane 6 the conveyor fills housing 8 with new predetermined number of bottles. When the housing rotates a clamp 11 prevents the articles 1 from moving. A photo cell is looking for gaps between products. If there is no gap the rotating post will turn about 180 degrees. FIG. 3 shows the housing rotating while clamp 11 prevents the articles 1 from moving.

The rotating post and the enclosures are supported by a frame 12 that that suspends the rotating post 7 above the conveyor. The top of the rotating post can have an attached sprocket driven by a motor 13. The rotation is usually about 180 degrees at a time.

The invention claimed is:

1. A process for changing the orientation of a predetermined number of articles moving in a first lane on a conveyor comprising
   moving the articles in a first lane on a conveyor,
   changing the orientation of the predetermined number of articles in the first lane,
   stopping the movement of the articles in the first lane while the orientation of the predetermined number of the articles are changed,
   releasing the articles after their orientation has been changed into a second lane.

2. A process according to claim 1 wherein the article's orientation is changed by allowing a predetermined number of articles to enter a first housing attached to a rotating post that rotates the housing containing the predetermine number of articles in a position for release into the second lane.

3. A process according to claim 2 wherein the rotating post has a second housing attached that allows a predetermined number of articles to enter the second housing while the articles are released from the first housing.

4. A process according to claim 2 wherein the second lane joins a third lane of articles that are to be bundled in predetermined sets with the articles in the second lane.

5. A process according to claim 4 where in the articles in third lane have caps that are orientated so that the caps are located on the outside of the bundle and the location of the caps on the article in the first lane have been changed so that in the third lane the caps are located on the outside of the bundle.

6. A process according to claim 1 wherein changing the orientation includes allowing the predetermined number of articles to enter a housing and rotating the housing containing the predetermined number of articles to a position for releasing the articles into a second lane.

7. An apparatus for changing the orientation of a predetermined number of articles in a first lane on a moving conveyor comprising
   means for changing the orientation of the articles in the lane,
   means for stopping the articles in the first lane to prevent movement of the articles in the lane while the orientation of a predetermined number of articles are changed, and
   releasing the articles after the orientation has been changed into a second lane.

8. An apparatus according to claim 7 having means for changing an articles' orientation by allowing a predetermined number of articles to enter a first housing attached to a rotating post that moves the predetermined number of articles to a second lane.

9. An apparatus according to claim 8 wherein the rotating post has a second housing attached that allows a predetermined number of articles to enter the second housing while the articles are released from the first housing.

10. An apparatus according to claim 8 having means for joining the articles in the second lane with the articles in the third lane which are to be bundled in predetermined sets.

11. An apparatus according to claim 10 where in the articles in third lane have caps that are orientated so that the caps are located on the outside of the bundle and the location of the caps on the article in the first lane have been changed so that in the second lane the caps are located on the outside of the bundle.

12. An apparatus according to claim 7 where in the means for changing the orientation includes means for transporting the predetermined number of articles into a housing and rotating the housing containing the predetermined number of articles to a position for release the articles.

13. An apparatus according to claim 7 where in the means for changing the orientation creates a second separate lane that does not overlap in width with the first lane.

14. A process according to claim 1 wherein the second lanes does not overlap in width with the first lane.

* * * * *